(12) United States Patent
Jafari et al.

(10) Patent No.: US 12,384,024 B2
(45) Date of Patent: Aug. 12, 2025

(54) THERMOACTIVATE MODULAR SOFT ACTUATOR BASED ON PHASE TRANSITION

(71) Applicant: UNIVERSITY OF NORTH TEXAS, Dallas, TX (US)

(72) Inventors: Amir Jafari, Dallas, TX (US); Trevor W. Exley, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 0 days.

(21) Appl. No.: 18/417,801

(22) Filed: Jan. 19, 2024

(65) Prior Publication Data
US 2024/0326240 A1 Oct. 3, 2024

Related U.S. Application Data

(60) Provisional application No. 63/480,649, filed on Jan. 19, 2023.

(51) Int. Cl.
| | |
|---|---|
| *B25J 9/14* | (2006.01) |
| *F15B 15/10* | (2006.01) |
| *F15B 21/0423* | (2019.01) |
| *F15B 21/0427* | (2019.01) |

(52) U.S. Cl.
CPC ............. *B25J 9/142* (2013.01); *F15B 15/103* (2013.01); *F15B 21/0423* (2019.01); *F15B 21/0427* (2019.01)

(58) Field of Classification Search
CPC ................................ F15B 15/103; B25J 9/142
See application file for complete search history.

(56) References Cited

PUBLICATIONS

Yoon et al., Bioinspired untethered soft robot with pumpless phase change soft actuators by bidriectional thermoelectrics, Chemical Engineering Journal,451 (2023), p. 139794.*

Ahmad et al., Development of Bending Soft Actuator with Different Braided Angles, Advanced Intelligent Mechatronics (2012) Jul. 11-14 IEEE/ASME International Conference.*

* cited by examiner

*Primary Examiner* — Nathaniel E Wiehe
*Assistant Examiner* — Daniel S Collins
(74) *Attorney, Agent, or Firm* — Andrew M. Metrailer; Conley Rose, P.C.

(57) ABSTRACT

An actuation device includes a Peltier comprising a first side and a second side; a first module thermally coupled to the first side of the Peltier, and a second module thermally coupled to the second side of the Peltier. The first module is configured to axially contract in response to an increased pressure within the first module and axially expand in response to a decreased pressure within the first module. The second module is configured to axially expand in response to an increased pressure within the second module and axially contract in response to a decreased pressure within the second module.

20 Claims, 3 Drawing Sheets

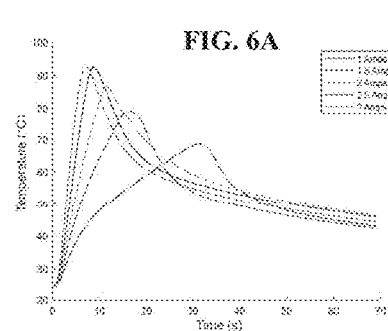
FIG. 6A
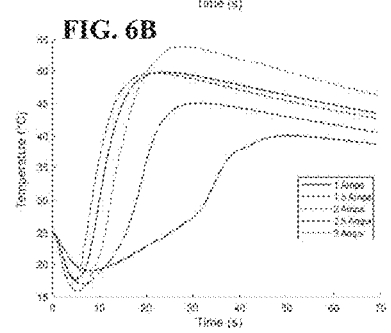
FIG. 6B
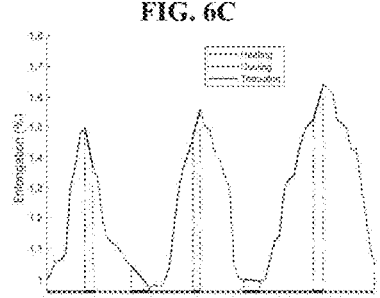
FIG. 6C
FIG. 6D
FIG. 6E
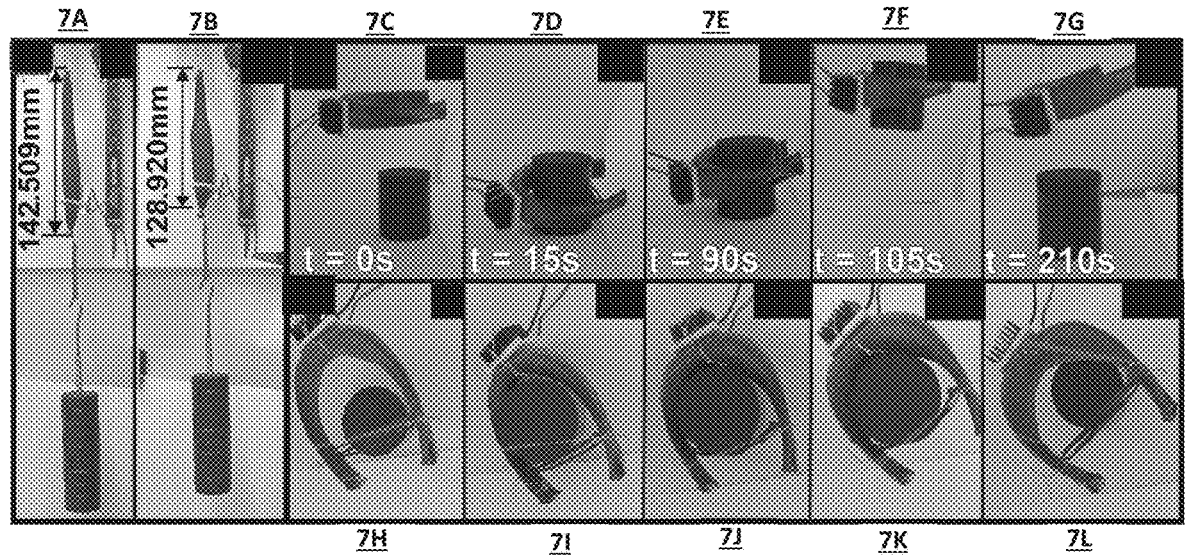
FIGS. 7A-7L

THERMOACTIVATE MODULAR SOFT ACTUATOR BASED ON PHASE TRANSITION

CROSS-REFERENCE TO RELATED APPLICATIONS

This application claims the benefit of U.S. Provisional Application No. 63/480,649, filed on Jan. 19, 2023, and entitled "THERMOACTIVATE MODULAR SOFT ACTUATOR BASED ON PHASE TRANSITION," which is incorporated herein by reference in its entirety for all purposes.

STATEMENT REGARDING FEDERALLY SPONSORED RESEARCH OR DEVELOPMENT

This invention was made with government support under contract nos. 2213263 and 2045177 awarded by The National Science Foundation. The government has certain rights in the invention.

BACKGROUND

There are about fifteen million mobility impaired people in the United states that often use assistance to move their limbs. The current wearable assistive technology is limited to powerful, but bulky exoskeletons or light, passive braces. Soft actuation methods are a developing field of robotics deemed suitable for physical human-robot interactions due to the adaptability of materials and compliant structures. Thermally-responsive soft actuators are a unique form of these methods as they typically heat materials above a certain temperature, resulting in a declining elastic modulus or contraction deformation. The drawback of using a heating stimulus is that the cooling of the actuator takes much longer, resulting in asymmetrical actuation cycles.

Soft robotics is a field more suitable for physical human-robot interactions (pHRI), as the materials used have a relatively low Young's modulus (less than 1 gigapascal (GPa)), are able to conform to their environments, and do not have high reflected inertias as rigid robotic systems. The flexibility of the material allows for the robots to be more versatile and can have embodied intelligence. This embodied intelligence generally allows for robotics to be better at navigating nature and nature's uniqueness to handle unrealized applications.

Thermo-active soft actuators are known for their high force generation per unit weight, and low power requirements. However, the drawbacks to this technology are the very low bandwidth (less than about 0.005 hertz (Hz)), and inefficiency of heating and cooling. Traditionally, resistive heaters have been used for the sole heating source of soft actuators, utilizing Joule heating ($I^2R$). However, these devices are characterized by inefficiency, as the cooling that occurs is passive only once current is removed.

Shape memory alloys have the ability to restore their shape after deformations via thermal or electrical charges. Shape memory alloys are known to have very high energy density, but slow actuation cycles due to conversion of heat to mechanical energy. Shape memory polymer's working principle is very similar to that of shape memory alloy, but has versatile actuation principles including light and moisture. These are some examples of thermo-active soft actuators that still deal with the issue of ineffective cooling.

However, traditional actuators suffer from several disadvantages.

BRIEF DESCRIPTION OF DRAWINGS

For a detailed description of the aspects of the disclosed processes and systems, reference will now be made to the accompanying drawings in which:

FIGS. 6A-E are graphical depictions of (6A) a hot side and corresponding (6B) a cold side of the Peltier with varying current sources. A current source is removed at the peak of each heating curve. A graphical depiction (6C) shows an elongation plotted for repeated actuation cycles using a dedicated heating and cooling Peltier. The sample used is a cylindrical with a 4 mm height and 15 mm diameter, and cured with 20% ethanol, by volume, and 5% zinc oxide by mass of only Ecoflex Part A and Part B silicone. A graphical depiction (6D) shows corresponding currents of the heating and cooling Peltier from the previous graph. A graphical depiction (6E) shows a stress-strain curve for the two samples prepared in FIGS. 4A-4F.

FIGS. 7A-L are photographic depictions of implementation of the Mckibben artificial muscle (mass equals 15.71 g with Peltier) using 0.4 milliliter (mL) of a heat transfer fluid sold under the trade designation Novec-7000 by 3M, Inc. of St. Paul, MN, in a nitrile pouch lifting a 500 g weight, (7A) resting and (7B) actuated (change in length equal to 13.59 mm). A side elevational view (FIGS. 7C-7G) and a top plan view (FIGS. 7H-7L) of a Mckibben artificial muscle with silicone membrane implemented as gripper (mass equal to 22.68 g with Peltier) (7C, 7H) descending, (7D, 7I) surrounding 100 g mass, (7E, 7J) closed around 100 g mass, (7F, 7K) lifting, and (7G, 7L) dropping with corresponding timestamps and views. Heating is initiated at t=10 s (electrical current (I) is equal to 2.25 amp (A)) and stopped at time equal to 115 second(s).

DETAILED DESCRIPTION

Figure 1A:
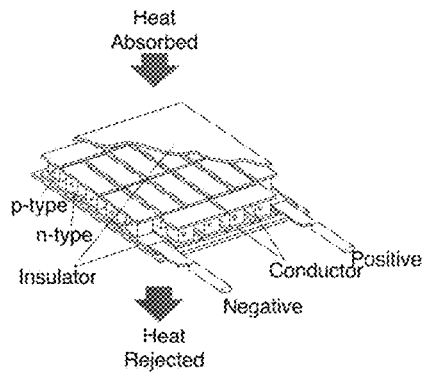
FIGS. 1A-B shows A) a cutaway view of a typical Peltier and B) an operation principle of a Peltier with one p-type and one n-type thermoelement.

This present systems and methods aim to create fundamental innovation in wearable assistive robots by introducing a new paradigm for portable and powerful network of modular soft actuators that work through liquid-gas phase transition. The high-level objective of this disclosure is to explain the fundamental engineering science for the modeling, design optimization, control and performance evaluation of the proposed networked actuators to be used in a robotic prosthetic elbow and to integrate them into education activities.

In some aspects, Mckibben artificial muscles are one of the most well-understood forms of soft robotics, as they are bio-inspired, adaptable to different working principles, and relatively simple. Traditionally, the actuation stimuli used has been pneumatic, where an elastic sleeve is wrapped in a braided mesh to limit radial expansion so that an increase in air pressure will lead to linear force generation and contraction. Recently, additional working stimuli have been applied using similar techniques, such as induction heating, shape memory alloy bending, and integrated sensing with dielectric elastomers.

In some embodiments, Peltier heating is evaluated as a reversible heating mechanism for thermo-active soft actuators to allow for faster deformations, more efficient heat transfer, and active cooling. The actuator consists of a thin elastic membrane filled with phase-change fluid, where applied heat can allow for the fluid to become vapor and create large deformation. This membrane is placed in a braided mesh to form a Mckibben muscle capable of lifting 5 newton (N) after 60 s of heating, and formed into a gripper capable of manipulating objects within the environment.

In some embodiments, Peltier junctions are shown to be a promising alternative to Joule heating introduced as a reversible thermo-active stimulus for controlling soft actuators. Peltiers utilize solid-state technology for heat transfer generated primarily through the use of dissimilar semiconductor material. This technology can be used as a low-power alternative to Joule heating, and can be scaled down to smaller footprint designs.

In some embodiments, two main working principles are used together for the actuation to occur: (i) Peltier heating, and (ii) Phase-change fluid volume expansion. A Peltier junction is used as the heating stimulus for the soft actuator design. The cooling and heating power at the junctions of temperature $Q_c$ and $Q_h$ can then be calculated.

$$Q_c = n\left[\alpha T_c I - \frac{1}{2}I^2 R - K(T_h - T_c)\right] \quad (1)$$

and similarly, the rate of heat liberated at the hot junction is:

$$Q_h = n\left[\alpha T_h I + \frac{1}{2}I^2 R - K(T_h - T_c)\right] \quad (2)$$

Off-the-shelf thermoelectric cooler (TEC) devices may be used, which typically have specifications such as output temperature difference ($\Delta T$) and output power ($Q_{max}$).

In some embodiments, the phase-change volume expansion of the system can consist of two main working principles. First, a thermal liquid that undergoes a phase-change from liquid to vapor increases the pressure of any cavity that contains the thermal liquid during this process, and increases the volume of the cavity if the walls are flexible. Second, the phase-change fluid can return to liquid form if properly encapsulated, resulting in reversibility of the first principle.

In some aspects, the mechanics of controlling and actuating untethered, wearable robots and powered prosthetics poses fundamental challenges that have not been solved by existing approaches. Human body motions usually come in low frequencies, thus an electromagnetic motor can be geared, leading to high reflected inertias and large compliance-mismatches between human and robot, as these actuators are made of rigid elements. Fluidic (pneumatic or hydraulic) actuators may solve some of these problems, but are limited by their own challenges, for example, such pneumatic or hydraulic actuators require electromechanical transduction to power the actuators on the limbs. In fact, the real actuation parts in these systems, are electromechanical transduction, which are rigid and usually not portable elements, even in case of soft pneumatic actuators. This rigidity within the actuation mechanism can pose safety hazards as well as ergonomic and wearer comfort problems, spurring the recent emergence of the soft robotics field.

The emerging field of soft robotics can be the foundation of future assistive technology. Generally, there are still no prior to the present disclosure soft and portable (e.g., can be operated with on-board power sources) actuators that are capable of assisting joint motion via short response times and with a high output force-to-size ratio. If this shortcoming is not met, rehabilitation and assistive technologies can be limited to existing passive braces or bulky exoskeletons and to rigid prosthetic devices that have proven to be not very efficient and functional for many applications and that are sometimes even dangerous for patients. The novel actuator as described herein is in the class of thermo-active soft actuators that use heat as an actuation stimuli. While easily portable and in some cases powerful, all prior thermo-active actuators developed so far, have one important drawback in common: they are very slow in response, especially for rehabilitation applications. It takes time to heat up and especially to cool down the actuator.

Here, a novel solution to this problem is presented by introducing flexible Peltiers, a modular design, and creating a network of the actuators. Furthermore, creating a network of the modular soft actuator allows for increased overall output force and the deflection range. This new technology has the potential to revolutionize the rehabilitation and assistive robotic devices by providing an actuation system that is soft, powerful, robust, and portable.

Actuators used in rehabilitation robotic systems should have a "soft" touch because they are in direct physical contact with patients. These actuators should also be enough powerful and fast to be able to help patients to move their limbs. In addition, they have to be portable and not attached to any stationary power source that limit the motions of the patients.

A rigid actuator can be controlled so that it is soft. This approach is known as active compliance. The passive compliance approach achieves a soft touch due to the presence of elastic elements. Series Elastic Actuators (SEAs) and Variable Stiffness Actuators (VSAs) are examples of the passive compliance approach. They are designed and implemented because of their ability to minimize large forces due to shocks, to safely interact with the user, and to store and release energy in passive elastic elements. VSAs use a variable-stiffness elastic mechanism, whereas SEAs use a constant stiffness component. VSAs can be very powerful and are sometimes fast in their responses. However, despite various implementations of VSAs in recent years, VSAs still pose a fundamental problem due to being made of intrinsically rigid components. As a result, VSAs are bulky, and in some cases, VSAs can feel similar to rigid bodies, e.g., when impact forces with frequencies that are beyond the tolerance of their controllers. VSAs are also not scalable because their performance in terms of output force and stiffness range widely, depending on their size.

Dielectric Elastomer Actuators (DEAs) are commonly known as artificial muscles because their impressive actuation strain and speed, their low density, and their silent operation can all mimic many of the desirable physical properties of muscle. DEAs have simple working and construction principles and outstanding actuation properties, and can consist of different materials for the dielectric and electrode layers. Unfortunately, the combination of these layers can cause incompatibilities in their interconnections. Dramatic differences in the mechanical properties and poor adhesion of the layers are the principal causes for the reduction of the actuation displacement and the significant lifetime reduction. Moreover, although they are intrinsically compliant and their response times are short, they demand high operating voltages in the scale of 20 kilovolt (KV), thereby preventing their operation with onboard batteries. That can be a drawback of DEAs to be used as a rehabilitation of assistive technology, because a power supply capable of providing such amount of extremely high voltage, is not portable.

Pneumatic Soft Artificial Muscles are another type of "so called" soft actuators commonly used in robotics. Their benefits include low weight and inherently compliant behavior. Compliance is due to the compressibility of air and, as such, it can be controlled with operating pressure. Generally these type of devices can require stationary power sources and accessories such as air pump and valves, which means such devices may not be portable.

Thermo-active actuators such as Shape Memory Alloys (SMA) can exhibit highly nonlinear behavior, have low energy efficiency, and have low response speeds. SMA advantages may include a high power-to-weight ratio, mechanism simplicity, silent actuation, low driving voltage, and intrinsic softness. The same holds true for other types of thermos-active soft actuators, such as polyethylene and nylon-based fishing line muscles. However, the foremost drawback of these actuators is their low bandwidth. For instance, the bandwidth of the thermo-active soft actuator presented is about $6 \times 10^{-3}$ Hz, which is extremely low for rehabilitation applications. The low bandwidth problem is due to the length of time to heat, and more particularly, to cool down the actuator.

As it is clear, none of the state-of-the-art soft actuators is perfectly suitable to be used in a rehabilitation or assistive robotic devices, as they are either made of rigid elements, or are not portable or have very low bandwidths or in case of electromagnetic soft actuators cannot provide enough forces.

In some embodiments, two main working principles are used together for the actuation to occur: (i) Peltier heating, and (ii) Phase-change fluid volume expansion. In 1834, French physicist Jean Charles Athanase Peltier discovered that when an electric current is made to flow through a junction between two different conductors, heat may be generated or removed at the junctions depending on the direction of electric current. This is known as the Peltier effect, which is the reverse of the Seebeck effect. With the development of semi-conductors, Peltiers became more efficient, and Peltiers have been used in many applications. Peltier junctions are shown to be a promising alternative to Joule heating introduced as a reversible thermo-active stimulus for controlling soft actuators. Peltiers utilize solid-state technology for heat transfer generated primarily through the use of dissimilar semiconductor material. This technology can be used as a low-power alternative to Joule heating, and can be scaled down to smaller footprint designs.

Figure 1B:
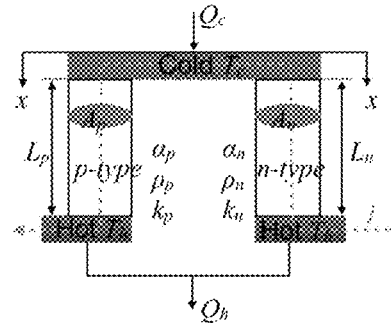

In some embodiments, consider a steady-state, one-dimensional Peltier, as shown in FIG. 1A. The Peltier can consist of many p-type and n-type thermocouples. One thermocouple (unicouple) with length L and cross-sectional area A is shown in FIG. 1B. When an electrical current I is applied, it induces a heat flow at the cold $Q_c$ and hot $Q_h$ junction temperatures, as shown in FIG. 1B. The heat flow can determine the temperature at each side of the Peltier based on the Seebeck effect coefficient α, thermal conductivity k, specific electrical resistance ρ, the cross-section area A and length L of n- and p-type semiconductors. So far, Peltiers have been all made of rigid elements, however, recently a company in Korea named "TEGway" achieved a technology to fabricate thin, light and flexible Peltiers. These flexible Peltiers utilize BiTe-based materials, which have been field-proven to be the most efficient thermo-active materials developed to date. TEGway's thermoelectric device can be in fact the world-first "Stand-Alone" high performance flexible thermoelectric device, according to the manufacturer. TEGway can fabricate flexible Peltiers in different sizes and shapes.

In some aspects, the modular soft actuator as described herein works based on dramatical volume expansion and contraction that happen during transition from a liquid to a gas and vice versa. In this process, a thermal liquid that undergoes a phase-change from liquid to vapor increases the pressure of any cavity that contains the thermal liquid during this process, and increases the volume of the cavity if the walls are flexible. When cooled, the phase-change fluid can return to liquid form if properly encapsulated, resulting in reversibility of the first principle.

Any suitable fluid can be used as the phase change fluid within the actuator. The phase change fluid can be selected to have a boiling point at or near the operating temperature of the actuator. For example, for devices operate at or near ambient conditions, the phase change fluid may have a boiling point between about 20° C. to about 80° C. Further, a fluid with a low heat of vaporization may be used to reduce the need for a high-power input to heat and cool the fluid. Traditionally, fluorocarbons have been used as a phase-change fluid since they have low boiling points (e.g. perfluorocyclohexane $t_{bp}$=51° C.). However, fluorocarbons can be damaging to ozone layers, which limits wide use. Various engineered fluids such as Novec-7000 can be used. Any other suitable fluid such as an alcohol, hydrocarbon, or the like can also be used.

As shown in FIG. 2, the soft actuator can be composed of two modules, A and B, connected in series and where flexible Peltiers are placed between each module. By supplying an electrical current to a Peltier, one side heats, while the other side cools, depending on the direction of the electric current. Module A can comprise a flexible, stretchable tube placed inside a braided sleeve, where the tube can be filled with a liquid. Module B comprises a flexible tube filled with liquid and placed inside two flexible but not stretchable cup-like sleeves. The sleeves can be elastically coupled. For example, the two sleeves can be connected through a stretchable rubber ring or through the use of bands or other elements. The liquid inside the tubes can change phase to a gas when it is heated up, and the gas can transition back into liquid once it is cooled down by the Peltiers. The phase transition can occur at or near a working temperature of the device.

The use of a Peltier can result in a relative wide temperature difference between the hot and cold sides during use. In some aspects, a temperature difference between the hot side and the cold side can be between at least about 1° C., at least about 5° C., at least about 10° C., at least about 20° C., at least about 30° C., at least about 40° C., at least about 50° C., at least about 60° C., or at least about 70° C. In some aspects, the temperature difference between the hot side and the cold side can be no more than about 120° C., no more than about 110° C., no more than about 100° C., no more than about 90° C., no more than about 80° C., no more than about 70° C., or no more than about 60° C.

When the Peltier's side next to the Module A gets hot, the generated heat changes the phase of the liquid inside the flexible tube to gas and as a result, the volume inside the tube increases. However, due to the braided sleeve covering the tube, this volume expansion leads to axial shrinkage of the Module A (and at the same time expansion of the diameter). When using the Peltier, the side next to Module B can cool down when the side next to Module A gets hot. When the Peltier's side next to the Module B gets cold, the gas can condense to a liquid and the rubber bands apply axial forces to bring back the length of the module to its initial value. This can result in an overall axial contraction of the actuator.

When the Peltier's side next to the Module B gets hot, the liquid can vaporize to form a gas, and the resultant volume expansion leads to axial expansion of the tube, as the cup-like sleeve does not allow for radial expansion (it is not stretchable). In this case, the elastic elements of Module B will be stretched. At the same time, the Peltier's side next to the Module A gets cold, and the absorbed heat changes the phase of the gas inside the flexible tube to liquid. As a result, the volume inside the tube decreases. Therefore, the module's length increases to its initial value due to the elasticity of the tube. This can result in an overall axial expansion of the actuator, or the application of an axial expansion force.

Overall, modules A and B have opposite changes in their lengths when they are heated up or cooled down. However, as the Peltier also have opposite sides (cold and hot) and are placed between modules, both modules shrink or expand at the same time, depending on the direction of electric current. Overall, the process can be relatively fast due to the ability to heat and cool opposite sides of the Peltier. In some aspects, the process can transition between a full contraction to a full expansion between about 1 second to about 4 minutes, between about 5 seconds to about 3 minutes, between about 10 seconds to about 2 minutes, between about 15 seconds to one minute, or between about 30 seconds to about 45 seconds.

Figures 2A, 2B, 2C, 2D:
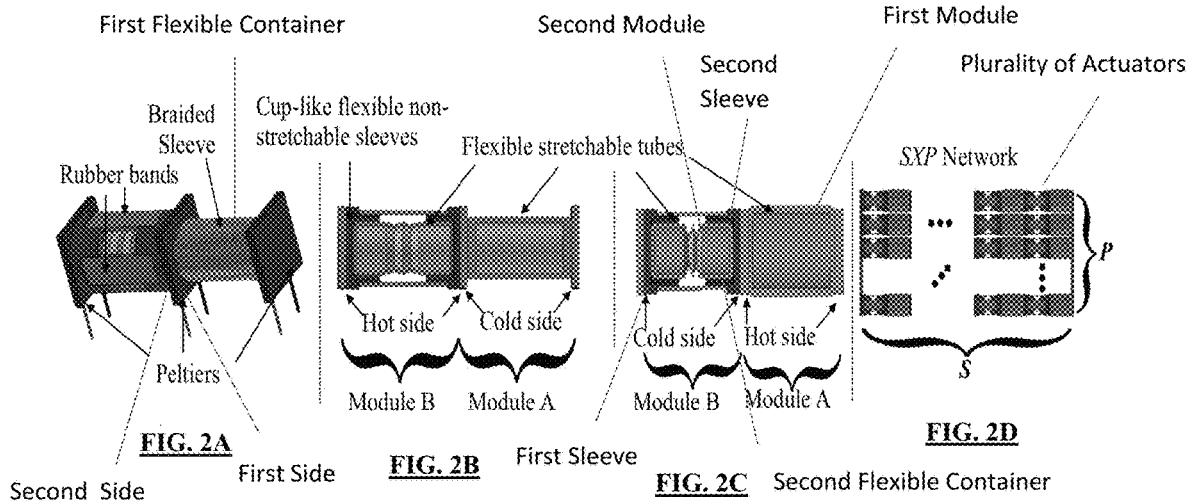
FIGS. 2A-D illustrates the working principle of a modular soft actuator. The FIGS. 2A-D show: A) a three-dimensional (3D) view of the actuator, B) a cross-section view of the two modules of a single actuator that are relaxed, C) a cross-section view of the two modules of a single actuator that are axially shrunk, and D) an SXP network of S series and P parallel actuators.
Figure 3:
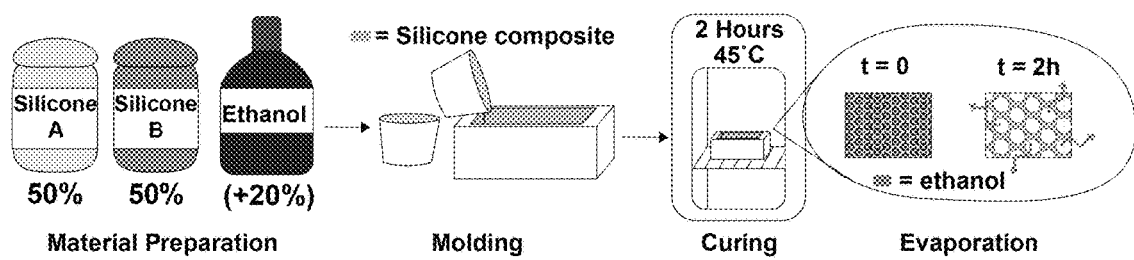
FIG. 3 illustrates a material preparation, 50%, by volume, platinum-catalyzed silicone (silicone Part A sold under the trade designation Ecoflex™ 00-50 rubber by Smooth-On, Inc. of Macungie, Pennsylvania, hereinafter "Ecoflex") is mixed with 50%, by volume, Ecoflex silicone Part B, and then 20%, by volume, of added ethanol before stirring and pouring into a desired mold. The mold is placed in a climate chamber at elevated temperatures to speed up the curing process that allows the liquid ethanol to expand within microbubbles formed before escaping the silicone matrix.

A network of small modular soft actuators can be created for two main reasons: 1) by making the actuators small, the time required to heat up the liquid or cool down the gas decreases, and 2) rather than increasing the size of an actuator to increase the overall force and deflection, a network of S series and P parallel small actuators, as shown in FIG. 2D, can produce an overall output force P times of the force of a single actuator, while the overall deflection would be S times the deflection of a single actuator. See, e.g., FIGS. 2A-C for details of the concept of the modular soft actuator. FIG. 2D shows a SXP network of these actuators.

Traditionally, fluorocarbons have been used as a phase-change fluid because they have low boiling points (e.g. per-fluorocyclohexane $t_{bp}$=51° C.). However, they can be damaging to ozone layers which limits widespread use. Therefore, Novec-7000 heat transfer fluid, an engineering fluid has been a suitable alternative.

In some aspects, the methods can include (A) the steps to fabricate the thermo-active actuators, (B) the characterization of the materials used and Peltier devices, (C) the evolution of the design for the actuator body, and (D) the design approaches to the actuator's applications.

EXAMPLES

The embodiments having been generally described, the following examples, are given as particular embodiments of the disclosure and to demonstrate the practice and advantages thereof. It is understood that the examples are given by way of illustration and are not intended to limit the specification or the claims in any manner.

Example 1

To prepare the silicone composite, 50% Ecoflex 00-50 Part A is mixed with 20% by volume of ethanol for two-three minutes. No effort is taken to remove the small air bubbles as the bubbles increase the Ecoflex's total elongation. A mold for the silicon is created for curing the silicon using computer aided-design (CAD) software and printed using a 3D printer. The mixture is poured into the mold and cured inside a climate chamber at 45° C. for at least 1 hour. The ethanol is then evaporated from the silicone by leaving the cured silicone in the climate chamber overnight. Next, the silicone is revived by soaking the silicone in Novec-7000 heat transfer fluid for between 30 minutes to 2 hours based on the volume of silicone.

Figures 4A, 4B, 4C, 4D, 4E, 4F, 4G, 4H, 4I, 4J:
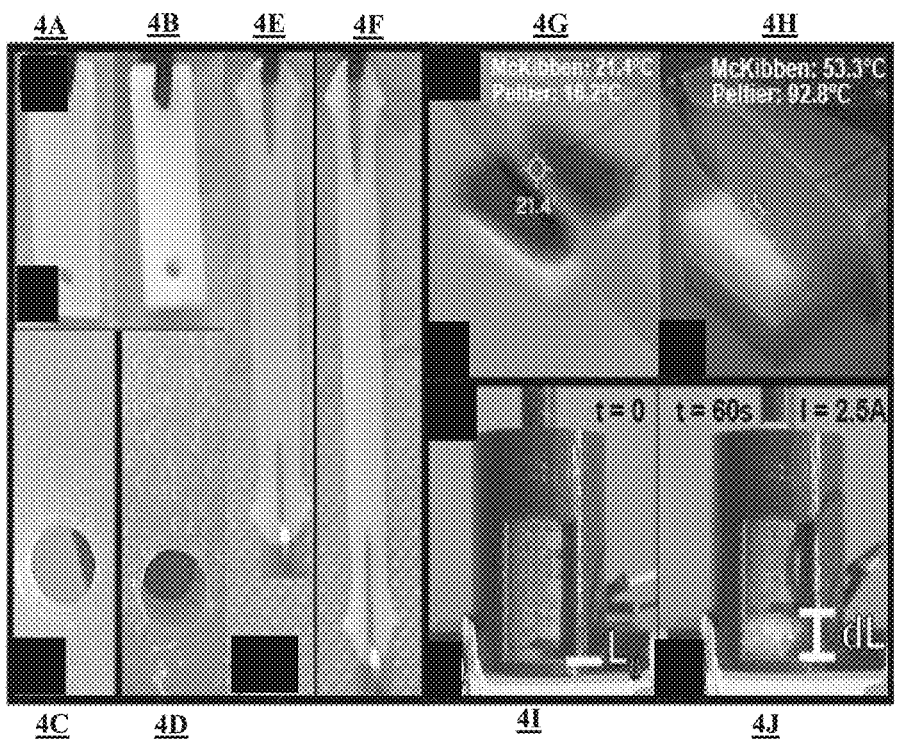
FIGS. 4A-J are photographic depictions of difference in elongation between Ecoflex 00-50 without ethanol (4A, 4C, 4E) and with ethanol (4B, 4D, 4F) showing (4A, 4B) initial length, (4C, 4D) visual bubbles, and (4E, 4F) stretch capabilities with an applied mass of 500 gram (g). Photographic depiction shows (4G-4H) Peltier surface and Mckibben body temperature during (4G) cooling and (4H) heating. Photograph depiction 4I-4J shows cylinder elongation of Ecoflex 00-50 with 20% ethanol from heating with the Peltier (i) initial length (3.9 millimeter (mm)), and (ii) fully expanded (7.7 mm) after 60 seconds at 2.5 Amps.

Referring to FIGS. 4A-C, multiple steps of characterization are performed. First, the actuation properties of the materials are realized using external heating (via Peltier). Next, data is collected using either collected images or temperature sensors. Finally, data is processed, analyzed, and desired specifications are integrated to the core design.

Videos are captured of the material's expansion, and then processed using a public domain Java image processing program ImageJ to measure the deformation of the soft body. The apparatus used is a hollow cylinder design with a weighted (5 g) plunger sanded smooth to help keep the sample in contact with the Peltier, and reduce any expansion due to curling (FIG. 4C). The larger Peltier (Table I) is used and ran at 2.5 amps, for 30 seconds, and the elongation is recorded. The percentage of ethanol is varied from is up to about 31%, by volume, or about 0 to about 31%, by volume, during the silicone mixing phase, and no effort is taken to remove air bubbles. The samples are cylindrical with a 13 mm diameter and a 3 mm thickness. The ethanol is removed and the samples are rejuvenated in Novec-7000 for 30 minutes. The findings demonstrate that 20%, by volume, ethanol mixture is the desired option as going higher does not increase expansion significantly. The Ecoflex mixture can become saturated around 31%, and adding more ethanol cannot lead to any more being mixed into the silicone. Similarly, zinc oxide is mixed into the curing stage to improve thermal conductivity. While no significant thermal conductivity is detected, the Novec-7000 retention in the samples is increased by adding 5%, by weight, zinc oxide by mass.

Initially, the expansion of the phase-change housing resembled similar efforts working with elastomeric structures with phase-change microcavities, but shifted towards the phase-change fluid being housed in a stretchable main shell in the form of a thin membrane (balloon) similar to other soft and wearable haptic display devices, such as HaPouch. These larger cavities are constructed for reasons threefold. First, the cavities result in higher repeatability as the phase-change fluid remained encapsulated after 5+ actuation cycles and had a shelf-life around four days without evaporation. Second, the cavities more closely resemble traditional pneumatic soft actuators, which allow for further simplification of the internal channels. Significantly, the speed of localized heating and cooling of the Peltier junctions can increase dramatically when placed on the side of the balloon where the phase-change fluid pools. For the Peltier, two thermoelectric cooler units CP402533 (25 mm×25 mm; single-stage) and CP68475H-2 (40 mm×40 mm; double-stage) are chosen (Table 1). Both utilize an arcTEC structure for improved performance and lifespan. This technology implements larger P/N-type semiconductors, higher temperature solder, and resin placed between the ceramic plates and copper pads. A dual-Peltier system can be implemented to increase the speed of actuation and decrease the lag time between actuation cycles. Even with heat sinks attached, the Peltier units can take much longer to cool once they are on for a single actuation cycle (about 20 seconds).

Two different designs are created to show the actuation capabilities of this technology: (i) Mckibben artificial muscle, and a (ii) soft gripper. These applications are chosen to display the high force generation, increased bandwidth, and versatility of the working principal.

For the Mckibben artificial muscle, a thin-nitrile membrane is cut 70 mm long (40 mm for the phase-change cavity and 30 mm slack for tying). Next, 0.4 mL Novec-7000 is added to the balloon before tying. The edges of the Mckibben are melted in a circular pattern for better contraction, and flares open some to still allow for the insertion of the balloon. A silicone external layer is created (using Ecoflex 00-50 plus ethanol) for maximum elongation. The silicone cannot be cured while in contact with the thin membrane, and be cured in stages in order to contain the balloon (i.e., cure two-part mold, add balloon and seal; alternatively cure a casing, and tie closed then cure in silicone).

TABLE 1

Material Specifications

| Peltier parameters arcTEC CP402533 | |
|---|---|
| Size | 25 mm × 25 mm × 3.3 mm |
| Output $Q_{max}$* | 39 W |
| Output ΔT | 75° C. |
| Input current max $I_{max}$ | 4.0 A |
| Internal resistance $\Omega_{in}$ | 2.88 Ω |
| Mass | 8.60 g |

TABLE 1-continued

Material Specifications

| arcTEC CP68475H-2 | |
|---|---|
| Size | 40 mm × 40 mm × 7.5 mm |
| Output $Q_{max}$* | 45 W |
| Output ΔT | 95° C. |
| Input current max $I_{max}$ | 6.8 A |
| Internal resistance $\Omega_{in}$ | 2.12 Ω |
| Mass | 43.22 g |
| Novec-7000 parameters | |
| Vaporization temperature $T_{vap}$ | 34° C. |
| Liquid density | 1,400 kg/m³ |
| Ecoflex 00-50 parameters | |
| Young's modulus | 170 Pa |
| Maximum Elongation | 900% |

*$T_h$ = 50° C.

Figure 5:
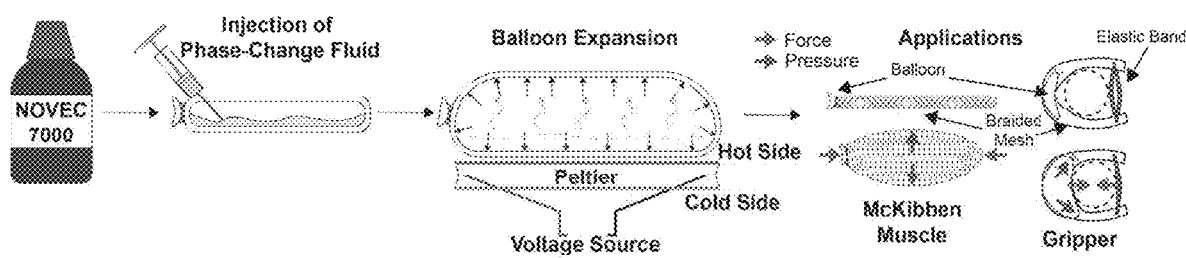
FIG. 5 illustrates that a phase-change fluid is injected into a balloon, to then be heated with the Peltier unit. Once heated, the fluid changes phases from liquid to vapor, and the internal pressure of the cavity increases leading to actuation. The first application depicted is a Mckibben artificial muscle, which shortens as the internal pressure increases, producing a linear force and small contraction deformation. The second application is a gripper, which utilizes a Mckibben muscle coated with silicone, and bent into a horseshoe shape by an elastic band, which conforms to a cylindrical object once the Mckibben bulges from an increase in pressure.

Referring to FIG. 5, for the gripper, a Mckibben is coated in a thin (less than 1 mm) layer of Ecoflex 00-50, and cure inside a climate chamber at 45° C. for 30 minutes. A second layer is added and the Mckibben is cured again at 45° C. for 30 minutes. Having two layers increases the stability of the silicone layer, and increase the friction of the silicone when used as a gripper. A prepared balloon is inserted into the Mckibben, and a rubber band is pulled taut between the two ends and fixed to the Mckibben by thin copper wire. This elastic band is used to create an artificial curvature for the Mckibben body. Once the phase-change component is heated, the Mckibben expands and applies radial pressure to any object central to the arc of the gripper. This results in a horseshoe-like appearance of the gripper. A thin copper wire is ran through the top and bottom sections of the gripper in the middle of the length of the Mckibben, creating a strand of wire fixed to both sides. This allowed for the Peltier to be tied to the Mckibben by twisting the wire strands together, to allow the Peltier as direct contact with the balloon as possible. The two ends of the gripper are tilted upwards at a small angle to ensure any liquid Novec-7000 would settle near the Peltier. A thin fishing line is tied to both ends and near the Peltier in order to lift and guide the gripper.

In some embodiments, the thermo-active phase-change soft actuator can also include a force generation module and be interchanged for a 'pouch motor' (biaxially-oriented polyethylene terephthalate (BoPET) sold under the trade designation MYLAR from Dupont Teijin Films US of Wilmington, Delaware, thin membrane, etc.), as depicted in FIGS. 7A-7B, using the same phase transition principle with a vaporization fluid (ethanol, NOVEC 7000, etc.). A BoPET is heat sealed with phase-change fluid inside. Additional origami structures can be formed with the BoPet membrane for the antagonistic module. Substituting a silicone elastomer for a thin sheet of the BoPet membrane drastically increases actuation speed and heat transfer.

In some embodiments, a device uses a liquid-to-gas phase change actuator and a Peltier device. The actuator is composed of a thin plastic pouch containing a small amount of a low boiling point liquid (NOVEC 7000). The temperature of the liquid is controlled by a Peltier device in close contact with an actuator. This approach allows soft actuators to be inflated without using a compressor and tubes. The actuators can be created with only heat sealing of the thin plastic film and liquid filling, which allows fabrication of actuators of various shapes and sizes. In addition, the temperature control of a Peltier device enables the control of inflation of an actuator.

In some embodiments, a soft plastic pouch contains a small amount of a low boiling point liquid (NOVEC 7000) and a Peltier device. When NOVEC 7000 inside the pouch reaches 34° C. or higher, the low boiling point liquid vaporizes and increases in volume, causing the pouch to expand. This induces displacement of the pouch. An advantage of temperature control by a Peltier device is that the pouch can be heated and cooled at a target temperature to control the inflation of the pouch. Owing to this principle, the device may omit air compressor and tubes.

The smaller Peltier (Table 1) is run until 70° C. for 1 A, 80° C. for 1.5 A, and 90° C. for 2-3 A (FIGS. 6A-B). These graphs show the average of 10 trials for each current. Flexible NTC thermistors are placed directly onto each side of the Peltier and held in contact with a silicone body to simulate the Peltier being cured inside a silicone mold.

An experiment is run using samples of silicone at varying percentages of ethanol by volume. These cylindrical samples are between about 3.8 to about 4.0 mm in height and about 15 mm in diameter and are fully submerged into Novec-7000 heat transfer fluid until saturation. The samples are placed inside a 3D printed cylindrical apparatus with a 5 gram (g) weighted plunger to hold the sample to the Peltier with as little impact on elongation as possible (FIG. 4C). This apparatus is used to easily image the elongation of each sample, and the elongation is measured using ImageJ. The samples are heated on the larger Peltier (Table 1) at 2.5 A for 30 seconds each and the optimal use of ethanol to increase silicone expansion due to phase-change fluids, is shown to be 20%. No significant increase in expansion is detected in the samples over 20%, and the saturation point of the mixture is around 31%.

A sample of 20% ethanol by volume and 5% zinc oxide by mass are used to rapidly cycle activation and deactivation of the phase-change. A 5% mass of zinc oxide is chosen due to the increased Novec-7000 retention of the sample. Using a single Peltier for these cycles took around 5 minutes for each cycle due to having to wait for the Peltier to cool off between activations. Thus two of the larger Peltiers (Table 1) with 40 mm×40 mm heatsinks are chosen to work in tandem to alleviate this issue and decrease the cycle time down to under about 2 minutes. Images are taken every 5 seconds, with a transition period when moving the sample from one Peltier to the other (FIG. 6C). The change in elongation of the sample in the transition can be attributed to exposure to room temperature, and being placed on a Peltier with ambient heat from previous activation. The graph shows the ability of the Peltier to fully actuate and de-actuate the sample in around 40 seconds and is able to achieve this multiple times in a row. The increase in maximum and minimum elongation with each cycle is expected, and causes by the increasing deformations of the silicone after each actuation. There is room to improve this and possibly use only a single Peltier by using more advanced Peltiers or by using active cooling methods.

For the Mckibben and the gripper, silicone is not used to house the phase-change fluid. The addition of ethanol in the curing process increases the ability of silicone to stretch, so this curing process is still used for the fabrication of the gripper. To show this increased ability, an experiment is run using two rectangular cured silicone blocks, one without ethanol and one with 20% ethanol. The stress and strain are taken for each block by attaching a mass of 0.5 kilogram (kg) off of one side of the silicone (FIG. 4A). The 20% ethanol silicone is able to achieve over 50% more strain at the highest stress level taken (FIG. 6E).

A nitrile balloon filled with Novec-7000 is placed inside a braided mesh to form a Mckibben artificial muscle (FIG. 7A). The top end is attached to a hook and a mass of 500 g is attached at the bottom. The small Peltier (Table 1) is attached to the bottom of the Mckibben with an elastic band where the phase-change fluid pooled to greatly increase the actuation time. The Mckibben artificial muscle (mass equal to 15.71 g with Peltier) was able to lift the 500 g mass to a height of 13.59 mm. The current is reversed and the Mckibben relaxes and returns to its original length. This experiment is done to show the similarity of a muscle contraction to this movement.

Images of the gripper (mass equals 22.68 g with Peltier) is taken (FIG. 7B) showing the design applied in grabbing and lifting a 100 g mass. The aerial views (FIG. 7C) show the gripper's ability to conform to an object. The silicone external layer of the gripper increases friction and alters the compliance of the braided mesh. The horseshoe design requires an object to be small enough to be placed within the arc of the design. The Peltier heats up and causes the braided mesh to straighten, forcing the two ends of the gripper to push together. The forces of the two sides pushing in on the object and the friction of the silicone and rubber band are what allows the gripper to grab and hold onto the object. In theory, reversing the current cools off the phase-change fluid enough to relax the gripper, freeing the object from its grasp. However, the drawbacks of this design are twofold, namely 1) attachment of the Peltier results in a nonplanar heat transfer surface which is very inefficient, and 2) by the time the full actuation occurs, both sides of the Peltier are above the transition temperature of the phase-change fluid, which requires additional external cooling for timely release of the object.

After running thermal graphs on each Peltier, it is found that optimal current would be around 35% of the maximum current for about 15 to about 20 seconds. This current keeps the power from being too high from the internal resistance increasing as the Peltier is heated. Any longer or using more current eliminates the Peltier's capability for active cooling without an external cooling source. The Peltier's active time can be increased by utilizing heatsinks, but the heatsinks can still accumulate heat that requires dissipation, removing the Peltier's capability of active cooling. Therefore, to decrease the amount of time the Peltier requires powering, the heat transfer to the actuator can be improved. One of the main issues with the heat transfer of the actuator is the low thermal conductivity of silicone, along with the Novec-7000 air bubbles expanding within. The silicone expanding creates pockets of air that further reduces the thermal conductivity of the silicone body. This low conductivity results in the heating of the soft actuator to be heavily concentrated at the contact surface of the Peltier, which causes localized expansion at the Peltier junction interface. Previously, utilizing resistive heating, experience this problem on a smaller level, as the soft body is built around the axis of an inner coil, and the heating and expansion occurs radially. This finding can lead to much lower aspect ratios with relation to the Peltier surface for the application design. A possible solution, is implementing thermally conductive nanoparticles which increase the thermal conductivity, leading to shorter heating cycles and further elongation. Additionally, the silicone has issues binding to surfaces excluding silicone. A working solution is to keep the silicone pressed against the Peltier to apply pressure on the silicone, which is counterproductive when trying to get the silicone to actuate. Some minor success is found by simply tying the silicone to the Peltier using thin metal wire. A possible solution is finding a way to bind the actuator to the Peltier to increase heating contact area, or create planar surfaces along the actuator that cannot expand for the heating interface.

To remove the variable of thermal conductance, the experiment shifts to completely removing the silicone, by filling a balloon with a small amount of Novec-7000 and placing it in contact with a Peltier. This experiment shows a drastic increase in actuation and deactuation cycles from 90 seconds down to 30 seconds when compared with Novec-7000 infused silicone. This speed is decreased noticeably by placing the balloon inside a braided mesh, as the heat has to transfer through the Mckibben to reach the balloon. Additionally, the balloon exhibits a significant increase of Novec-7000 retention compared to the silicone body. The thin membrane of the balloon is all the barrier that the heat has to move through to boil the Novec-7000, decreasing the time required to actuate the balloon to about 10 seconds. This allows for the ability to de-actuate the balloon using the same Peltier immediately after actuation without rest. Furthermore, this heating interaction may require optimization to allow for reversibility and active cooling in more applications and designs.

Simplistic structures are able to be created using the thin-membrane design for the applications. The general principle allows the user direct expansion through the introduction of design parameters such as strain-limiting layers.

In conclusion, the design choice of using a thin membrane (balloon) to store the phase-change liquid removes the poor thermal conductivity of silicone, vastly increasing the longevity of the Novec-7000 in the order of days as opposed to minutes, and removes the need to adhere the expanding silicone body directly onto a Peltier. Additionally, it simplifies the application designs to resemble pneumatic soft actuators.

Overall, Peltiers are inefficient once the power source is removed, as both the hot side and cold side begin to equalize as they are exposed to the ambient temperature. Although the disclosure focuses on the Peltier effect, there may also be applications in soft robotics where the opposite effect, the Seebeck effect, may be beneficial such as energy harvesting.

This disclosure demonstrates the promising implementation of Peltier devices as the heating stimuli of thermo-active soft actuators, which can allow for active cooling and enhanced control. Optimization of design and heating, and targeting thermoelectric devices that utilize organic materials, may also be pursued, which can be integrated to soft actuators. Additionally, a control system can be integrated for the Peltiers, as heat transfer becomes more efficient if incorporation of the passive heating of the Peltier after current removal from the actuation process.

Having described various systems and methods herein, certain embodiments can include, but are not limited to:

In a first aspect, an actuation device comprises: a Peltier comprising a first side and a second side; a first module thermally coupled to the first side of the Peltier, wherein the first module is configured to axially contract in response to an increased pressure within the first module and axially expand in response to a decreased pressure within the first module; and a second module thermally coupled to the second side of the Peltier, wherein the second module is configured to axially expand in response to an increased pressure within the second module and axially contract in response to a decreased pressure within the second module.

A second aspect can include the actuation device of the first aspect, further comprising a first phase change fluid disposed in the first module, the second module, or both.

A third aspect can include the actuation device of the first aspect or the second aspect, wherein the first phase change fluid has a boiling point between about 20° C. and about 80° C.

A fourth aspect can include the actuation device of any one of the proceeding aspects, wherein the first module comprises: a braided sleeve; a first flexible container disposed within the braided sleeve; and a phase change fluid disposed within the first flexible container.

A fifth aspect can include the actuation device of any one of the proceeding aspects, wherein the second module comprises: a first sleeve elastically coupled to a second sleeve; a second flexible container disposed between the first sleeve and the second sleeve; and a phase change fluid disposed within the second flexible container.

A sixth aspect can include the actuation device of any one of the proceeding aspects, wherein the first sleeve and the second sleeve are rigid.

A seventh aspect can include the actuation device of any one of the proceeding aspects, wherein the Peltier is configured to heat the first side and cool the second side in response to a current passed through the Peltier.

In an eighth aspect, an actuation device comprises: a plurality of actuators, where each actuator of the plurality of actuators comprises: a Peltier comprising a first side and a second side; a first module thermally coupled to the first side of the Peltier, wherein the first module is configured to axially contract in response to an increased pressure within the first module and axially expand in response to a decreased pressure within the first module; a second module thermally coupled to the second side of the second side of the Peltier, wherein the second module is configured to axially expand in response to an increased pressure within the second module and axially contract in response to a decreased pressure within the second module.

A ninth aspect can include the actuation device of the eighth aspect, wherein the plurality of actuators are arranged in series.

A tenth aspect can include the actuation device of the eighth aspect or the ninth aspect, wherein the plurality of actuators are arranged in parallel.

In an eleventh aspect, a method of applying a force comprises: heating a first fluid in a first module to increase a pressure within the first module; axially contracting the first module in response to the increased pressure within the first module; cooling, while heating the first fluid, a second fluid in a second module to decrease a pressure within the second module; axially contracting the second module in response to the decreased pressure within the second module.

A twelfth aspect can include the method of the eleventh aspect, further comprising: cooling the first fluid in the first module to decrease the pressure within the first module; axially expanding the first module in response to the decreased pressure within the first module; heating, while cooling the first fluid, the second fluid in the second module to increase the pressure within the second module; axially expanding the second module in response to the increased pressure within the second module.

A thirteenth aspect can include the method of the eleventh aspect or twelfth aspect, wherein a time between fully axially contracting the first module to fully axially expanding the first module is between about 10 seconds to about 2 minutes.

A fourteenth aspect can include the method of any one of the eleventh to thirteenth aspects, wherein heating the first fluid vaporizes at least a portion of the first fluid within the first module.

A fifteenth aspect can include the method of any one of the eleventh to fourteenth aspects, wherein cooling the second fluid condenses at least a portion of the second fluid within the second module.

A sixteenth aspect can include the method of any one of the eleventh to fifteenth aspects, wherein the first module comprises: a braided sleeve; a first flexible container disposed within the braided sleeve; and a phase change fluid disposed within the first flexible container.

A seventeenth aspect can include the method of any one of the eleventh to sixteenth aspects, wherein the second module comprises: a first sleeve elastically coupled to a second sleeve; a second flexible container disposed between the first sleeve and the second sleeve; and a phase change fluid disposed within the second flexible container.

An eighteenth aspect can include the method of any one of the eleventh to seventeenth aspects, wherein heating the first fluid and cooling the second fluid comprises using a Peltier comprising a first side and a second side, wherein the Peltier heats the first side and cools the second side in response to a current passed through the Peltier.

A nineteenth aspect can include the method of any one of the eleventh to eighteenth aspects, wherein a difference in temperature between the first side and the second side is between about 10° C. to about 110° C.

A twentieth aspect can include the method of any one of the eleventh to nineteenth aspects, wherein the first fluid and the second fluid have the same composition.

For purposes of the disclosure herein, the term "comprising" includes "consisting" or "consisting essentially of." Further, for purposes of the disclosure herein, the term "including" includes "comprising," "consisting," or "consisting essentially of."

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

While embodiments of the invention have been shown and described, modifications thereof can be made by one skilled in the art without departing from the spirit and teachings of the invention. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

The invention claimed is:

1. An actuation device comprising:
a Peltier comprising a first side and a second side;
a first container thermally coupled to the first side of the Peltier, wherein the first container is configured to axially contract in response to an increased pressure within the first container and axially expand in response to a decreased pressure within the first container; and
a second container thermally coupled to the second side of the Peltier, wherein the second container is configured to axially expand in response to an increased pressure within the second container and axially contract in response to a decreased pressure within the second container,
wherein the second container comprises:
a first rigid sleeve elastically coupled to a second rigid sleeve; and
a second flexible container disposed between the first rigid sleeve and the second rigid sleeve.

2. The actuation device of claim 1, further comprising a first phase change fluid disposed in the first container.

3. The actuation device of claim 2, wherein the first phase change fluid has a boiling point between about 20° C. and about 80° C.

4. The actuation device of claim 1, wherein the first container comprises:
a braided sleeve;
a first flexible container disposed within the braided sleeve; and
a first phase change fluid disposed within the first flexible container.

5. The actuation device of claim 1, wherein the Peltier is configured to heat the first side and cool the second side in response to a current passed through the Peltier.

6. The actuation device of claim 1, wherein a second phase change fluid disposed within the second flexible container.

7. An actuation device comprising:
a plurality of actuators, where each actuator of the plurality of actuators comprises:
a Peltier comprising a first side and a second side;
a first container thermally coupled to the first side of the Peltier, wherein the first container is configured to axially contract in response to an increased pressure within the first container and axially expand in response to a decreased pressure within the first container; and
a second container thermally coupled to the second side of the second side of the Peltier, wherein the second container is configured to axially expand in response to an increased pressure within the second container and axially contract in response to a decreased pressure within the second container, wherein the second container comprises:
a first rigid sleeve elastically coupled to a second rigid sleeve; and
a second flexible container disposed between the first rigid sleeve and the second rigid sleeve.

8. The actuation device of claim 7, wherein the plurality of actuators are arranged in series.

9. The actuation device of claim 7, wherein the plurality of actuators are arranged in parallel.

10. The actuation device of claim 7, wherein the first container comprises:
a braided sleeve;
a first flexible container disposed within the braided sleeve; and
a first phase change fluid disposed within the first flexible container,
wherein the first phase change fluid has a boiling point between about 20° C. and about 80° C., and a second phase change fluid disposed within the second flexible container.

11. A method of applying a force, the method comprising:
heating a first fluid in a first container to increase a pressure within the first container;
axially contracting the first container in response to the increased pressure within the first container;
cooling, while heating the first fluid, a second fluid in a second container to decrease a pressure within the second container; and
axially contracting the second container in response to the decreased pressure within the second container,
wherein the second container comprises:
a first rigid sleeve elastically coupled to a second rigid sleeve; and
a second flexible container disposed between the first rigid sleeve and the second rigid sleeve.

12. The method of claim 11, further comprising:
cooling the first fluid in the first container to decrease the pressure within the first container;
axially expanding the first container in response to the decreased pressure within the first container;
heating, while cooling the first fluid, the second fluid in the second container to increase the pressure within the second container; and
axially expanding the second container in response to the increased pressure within the second container.

13. The method of claim 12, wherein a time between fully axially contracting the first container to fully axially expanding the first container is between about 10 seconds to about 2 minutes.

14. The method of claim 11, wherein heating the first fluid vaporizes at least a portion of the first fluid within the first container.

15. The method of claim 11, wherein cooling the second fluid condenses at least a portion of the second fluid within the second container.

16. The method of claim 11, wherein the first container comprises:
a braided sleeve;
a first flexible container disposed within the braided sleeve; and
a first phase change fluid disposed within the first flexible container.

17. The method of claim 16, wherein the first phase change fluid has a boiling point between about 20° C. and about 80° C., and a second phase change fluid disposed within the second flexible container.

18. The method of claim 11, wherein heating the first fluid and cooling the second fluid comprises using a Peltier comprising a first side and a second side, wherein the Peltier heats the first side and cools the second side in response to a current passed through the Peltier.

19. The method of claim 18, wherein a difference in temperature between the first side and the second side is between about 10° C. to about 110° C.

20. The method of claim 11, wherein the first fluid and the second fluid have a same composition.

* * * * *